United States Patent
Onodera et al.

(10) Patent No.: US 12,547,013 B2
(45) Date of Patent: Feb. 10, 2026

(54) LENS DRIVING DEVICE, CAMERA DEVICE AND ELECTRONIC APPARATUS

(71) Applicant: New Shicoh Motor Co., LTD, Zhejiang (CN)

(72) Inventors: Kei Onodera, Yamato (JP); Kazuhiko Naito, Yamato (JP)

(73) Assignee: New Shicoh Motor Co., LTD, Zhejiang (CN)

( * ) Notice: Subject to any disclaimer, the term of this patent is extended or adjusted under 35 U.S.C. 154(b) by 771 days.

(21) Appl. No.: 17/703,451

(22) Filed: Mar. 24, 2022

(65) Prior Publication Data
US 2022/0334403 A1   Oct. 20, 2022

(30) Foreign Application Priority Data
Apr. 14, 2021   (CN) .......................... 202110399493.0

(51) Int. Cl.
G02B 27/64   (2006.01)
G02B 7/02   (2021.01)

(52) U.S. Cl.
CPC ............ *G02B 27/646* (2013.01); *G02B 7/02* (2013.01)

(58) Field of Classification Search
CPC . G02B 7/00; G02B 7/02; G02B 7/021; G02B 7/022; G02B 7/023; G02B 7/028; G02B 7/04; G02B 7/09; G02B 27/64; G02B 27/646
USPC ................... 359/554–557, 808–830
See application file for complete search history.

(56) References Cited

U.S. PATENT DOCUMENTS

| | | | | | |
|---|---|---|---|---|---|
| 4,780,739 | A | * | 10/1988 | Kawakami | H04N 23/6811 348/208.99 |
| 5,768,016 | A | * | 6/1998 | Kanbara | G02B 27/646 359/557 |
| 6,618,212 | B2 | * | 9/2003 | Chikami | G02B 7/102 359/699 |
| 7,652,829 | B2 | * | 1/2010 | Mitani | G02B 15/16 359/699 |
| 2006/0181748 | A1 | * | 8/2006 | Makii | G02B 7/026 358/500 |
| 2014/0376117 | A1 | * | 12/2014 | Isaka | G03B 3/10 359/824 |

FOREIGN PATENT DOCUMENTS

| JP | 2006-26549 | * | 2/2006 |
|---|---|---|---|
| JP | 2008199755 A | | 8/2008 |

* cited by examiner

*Primary Examiner* — Thong Q Nguyen
(74) *Attorney, Agent, or Firm* — Hayes Soloway PC

(57) ABSTRACT

A lens driving device includes a lens holding portion, a driving shaft, a vibration member, and a straight-ahead cam mechanism. The lens holding portion has a holding portion for holding a lens body and is movable in an optical axis direction of the lens body. The driving shaft extends and is supported in a direction orthogonal to the optical axis direction. The vibration member is connected to one end of the driving shaft and causes the driving shaft to micro-vibrate. The straight-ahead cam mechanism is supported by the driving shaft and is movable in an axial direction of the driving shaft. The straight-ahead cam mechanism includes a first sliding surface and the lens holding portion is provided with a second sliding surface. By sliding the first sliding surface with respect to the second sliding surface, force is converted to move the lens holding portion in the optical axis direction.

16 Claims, 6 Drawing Sheets

LENS DRIVING DEVICE, CAMERA DEVICE AND ELECTRONIC APPARATUS

CROSS-REFERENCE TO RELATED APPLICATIONS

This application claims the benefit of Chinese Patent Application No. 202110399493.0 filed Apr. 14, 2021, which is hereby incorporated by reference herein in its entirety.

TECHNICAL FIELD

The present disclosure relates to a lens driving device used in electronic apparatus such as smartphones and monitoring cameras, a camera device and an electronic apparatus.

BACKGROUND

A lens driving device for AF (Auto Focus) using a piezoelectric element as a driving source moves a lens body at a fine pitch by expansion and contraction of the piezoelectric element, intermittently. Japanese Patent Application Laid-Open No. 2008-199755 (Patent Document 1) discloses a technique capable of contributing to low-profile of a lens driving device for AF using a piezoelectric element as a driving source. In the driving device described in Patent Document 1, a screw thread is provided on the inner periphery of a hole in the center of a guide member which is a fixed body, and a screw groove is provided on the outer periphery of a lens barrel which a movable body for holding the lens body, and the lens barrel is screwed to the hole of the guide member, and a piezoelectric element and a weight are provided at a convex portion on the outer periphery of the lens barrel. In this driving device, when a voltage is applied to the piezoelectric element, the piezoelectric element expands and contracts in the tangential direction of the lens barrel to apply microvibration to the lens barrel, and the lens barrel moves in the optical axis direction of the lens while rotating along the spiral of the screw.

SUMMARY

However, in view of known prior art, there was a problem that the lens body rotates together with the movement of the lens barrel, which is the movable body, along the optical axis direction.

The present disclosure has been made in view of such a problem, and the present disclosure aims to realize a low-profile of the lens driving device using the vibration member as the driving source without rotation of the lens body.

To achieve the above-described object, in accordance with a first aspect of the present disclosure, there is provided a lens driving device including: a lens holding portion that has a holding portion for holding a lens body and is supported so as to be movable in an optical axis direction of the lens body; a driving shaft extending and supported in a direction orthogonal to the optical axis direction; a vibration member connected to one end of the driving shaft and causing the driving shaft to micro-vibrate; and a straight-ahead cam mechanism supported by the driving shaft so as to be movable in an axial direction of the driving shaft, wherein the straight-ahead cam mechanism is provided with a first sliding surface, the lens holding portion is provided with a second sliding surface, and by sliding of the first sliding surface with respect to the second sliding surface, a force by which the straight-ahead cam mechanism moves in the axial direction is converted into a force for moving the lens holding portion in the optical axis direction.

In accordance with a second aspect of the present disclosure, there is provided a camera device including the lens driving device described above.

In accordance with a third aspect of the present disclosure, there is provided an electronic apparatus including the camera device described above.

Further features of the present invention will become apparent from the following description of exemplary embodiments (with reference to the attached drawings).

DETAILED DESCRIPTION

Figure 1:
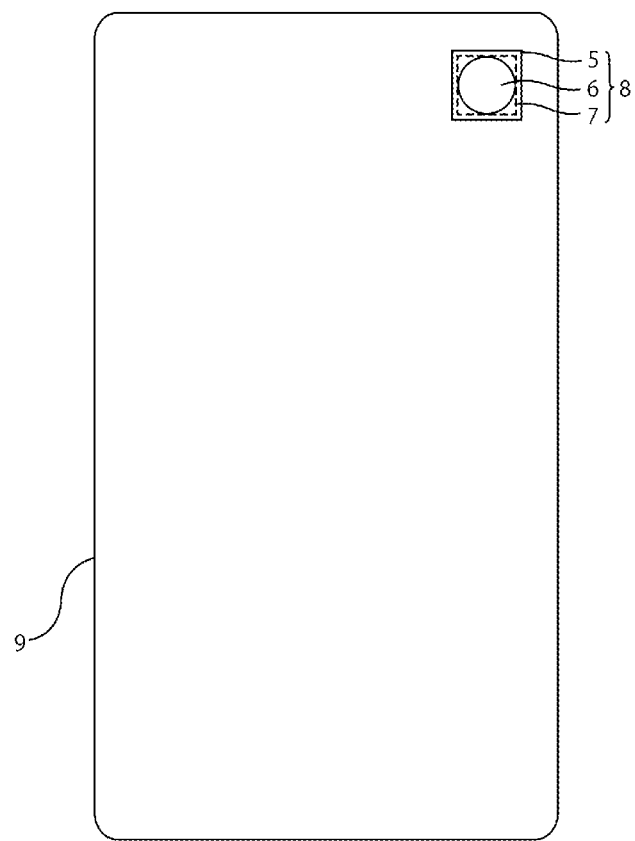
FIG. 1 is a front view of a smartphone on which a camera device including a lens driving device according to one embodiment of the present disclosure is mounted.

Hereinafter, embodiments of the present disclosure are explained with reference to drawings. As shown in FIG. 1, a camera device 8 including a lens driving device 5 according to one embodiment of the present disclosure is accommodated in a smartphone 9.

The camera device 8 includes: a lens body 6; an image sensor 7 converting light incident through the lens body 6 into an image signal; and a lens driving device 5 holding the lens body 6 and the image sensor 7 and driving the lens body 6 in an optical axis direction of the lens body 6 with respect to the image sensor 7.

Figure 2:
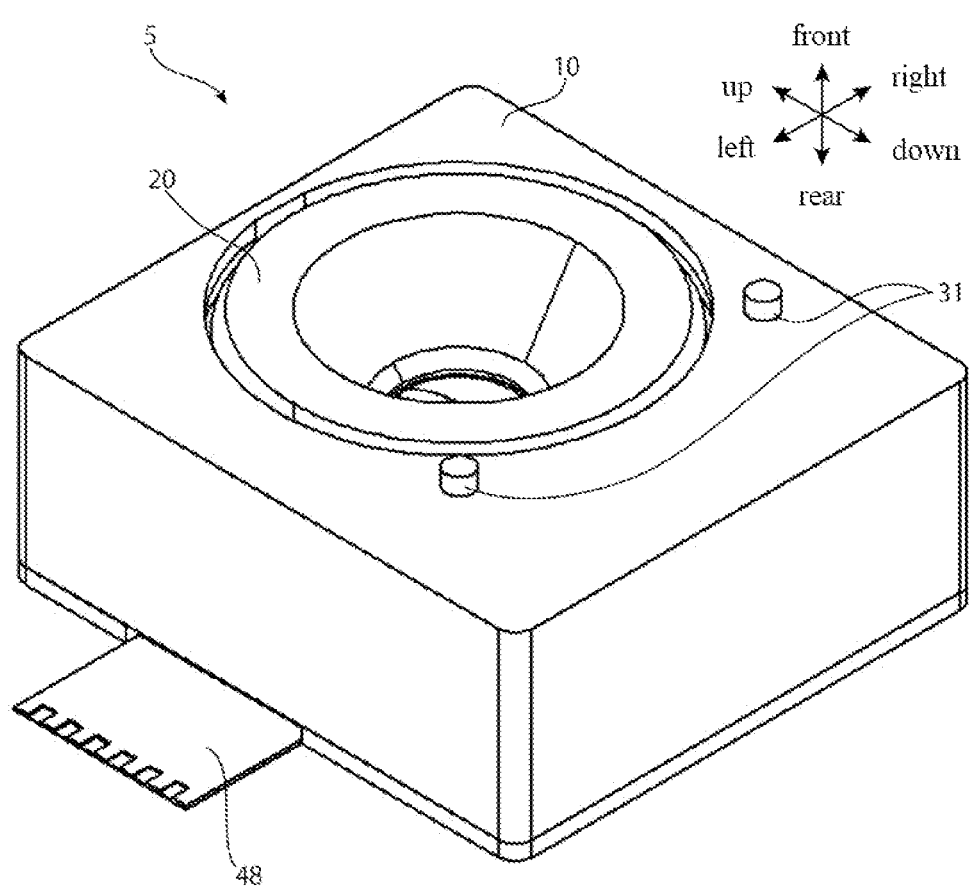
FIG. 2 is a perspective view of the lens driving device shown in FIG. 1.
Figure 3:
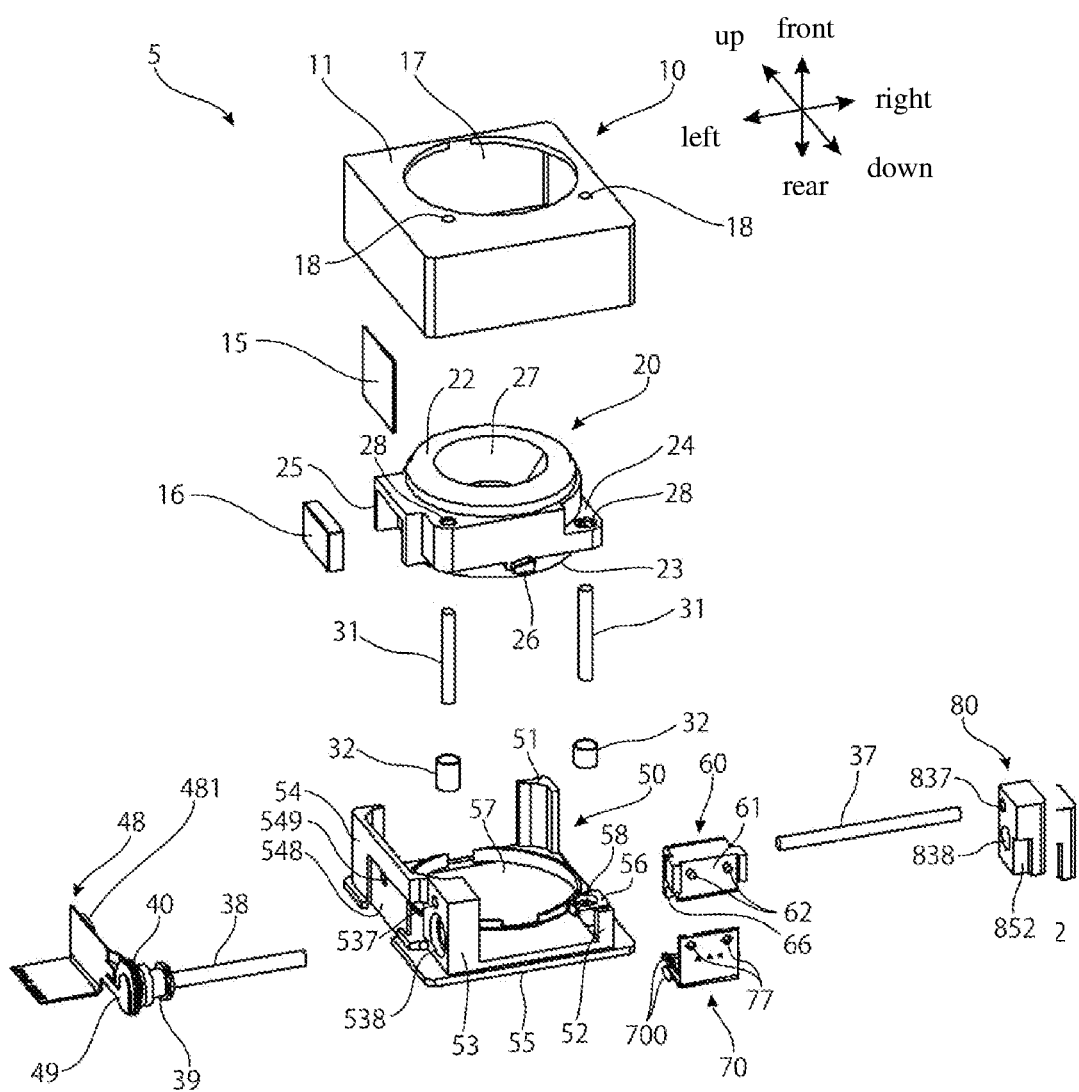
FIG. 3 is an exploded perspective view of the lens driving device shown in FIG. 2.
Figure 5:
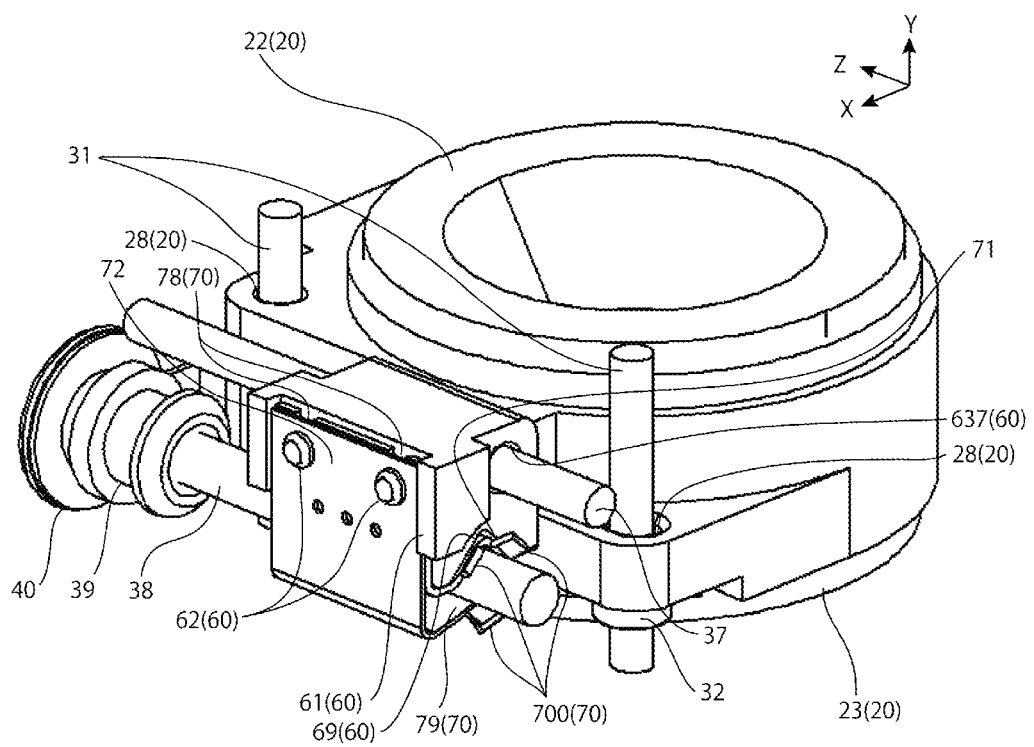
FIG. 5 is a perspective view of the main portion of the lens driving device shown in FIG. 2 as viewed from another angle.

Hereinafter, as shown in FIG. 5, the direction in which the light from the subject is incident is appropriately referred to as a Y direction, one direction orthogonal to the Y direction is appropriately referred to as an X direction, and a direction orthogonal to both the Y direction and the X direction is appropriately referred to as a Z direction. Further, as shown in FIGS. 2 and 3, the side of the subject in the optical axis direction of the lens body 6 is referred to as a front side, and the side opposite to the subject on which the image sensor 7 is provided is referred to as a rear side. Further, two directions orthogonal to the optical axis direction and orthogonal to each other are referred to as a left-right direction and an up-down direction, and one side in the left-right direction is referred to as a left side, the other side is referred to as a right side, one side in the up-down direction is referred to as an upper side, and the other side is referred to as a lower side.

As shown in FIG. 3, the lens driving device 5 has a case 10, a magnetic material plate 15, a magnet 16, a lens holding portion 20, a guide shaft 31, a coil spring 32, a support shaft 37, a driving shaft 38, a rubber bush 39, a vibration member 40, FPC (flexible printed circuit board) 48, a base 50, a straight-ahead cam mechanism 60, a spring member 70, and a support member 80.

The case 10 is in a box shape with one surface opened. A through hole 17 through which light from a subject passes, is provided at the center of the front plate 11 of the case 10 and two fixing holes 18 are provided side by side in the left-right direction around the through hole 17.

The base 50 has a quadrangular rear plate 55, a first column portion 51, a second column portion 52, and a third column portion 53 rising from corners on the upper right side, the lower right side, and the lower left side of the rear plate 55, and a side plate 54 rising from an end edge on the left side of the rear plate 55. The second column portion 52 is arranged slightly shifted from the right end of the rear plate 55 to the left side of the rear plate 55. The third column portion 53 is arranged slightly shifted from the left end of the rear plate 55 to the right side of the rear plate 55. The rear plate 55 is provided with a through hole 57 at the center thereof through which light from a subject passing through the lens body 6 passes.

The heights of the first column portion 51, the third column portion 53, and the side plate 54 are approximately the same. The height of the second column portion 52 is lower than the heights of the first column portion 51, the second column portion 52, and the side plate 54. A rectangular recess portion 548 is provided on the outer surface of the side plate 54. A hole 549 is provided in the recess portion 548. The magnetic material plate 15 is fixed to the inner surface of the side plate of the case 10. The third column portion 53 is provided with a fixing hole 537 and a round hole 538. The fixing hole 537 and the round hole 538 penetrate the third column portion 53 in the left-right direction.

Table portions 56 with flat front surfaces are provided between the second column portion 52 and the peripheral edge of the through hole 57 and between the third column portion 53 and the peripheral edge of the through hole 57 on the rear plate 55 (the table portion 56 on the third column portion 53 side is not shown). The table portion 56 is provided with a fixing hole 58.

The support member 80 is in a rectangular parallelepiped shape having approximately the same size as the third column portion 53. A portion including one corner of the support member 80 is notched as a recess portion 852. The support member 80 is provided with a fixing hole 837 and a round hole 838. The fixing hole 837 and the round hole 838 penetrate the support member 80 in the left-right direction. The support member 80 is fixed to the rear plate 55 so as to fit the second column portion 52 into the recess portion 852.

The straight-ahead cam mechanism 60 is in an approximately rectangular parallelepiped shape. As shown in FIG. 5, the straight-ahead cam mechanism 60 is provided with a support hole 637. The support hole 637 penetrates the straight-ahead cam mechanism 60 in the left-right direction. The support shaft 37 is passed through the support hole 637 so that the straight-ahead cam mechanism 60 is movably supported and guided in the left-right direction which is the axial direction of the support shaft 37. There is a plane portion 61 at the lower end portion of the straight-ahead cam mechanism 60. The plane portion 61 is provided with two positioning protrusions 62.

Figure 4:
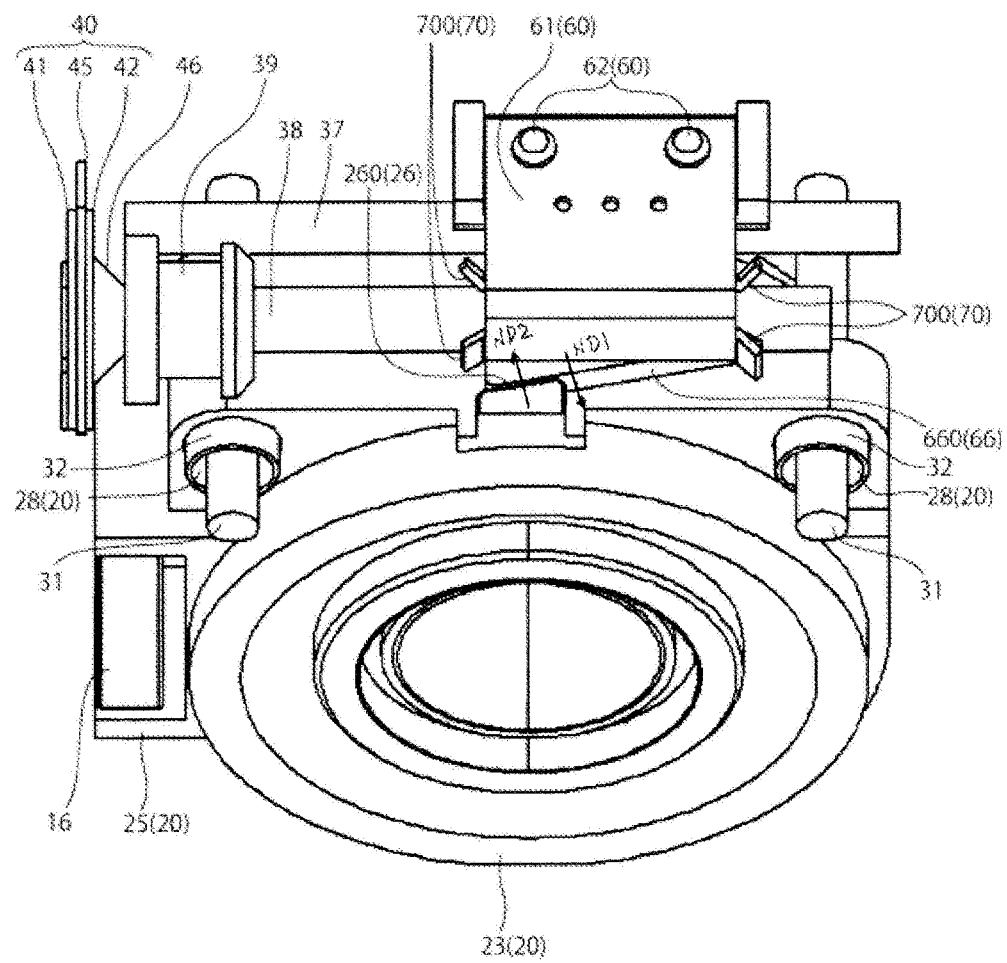
FIG. 4 is a perspective view of a main portion of the lens driving device shown in FIG. 2.
Figure 6:
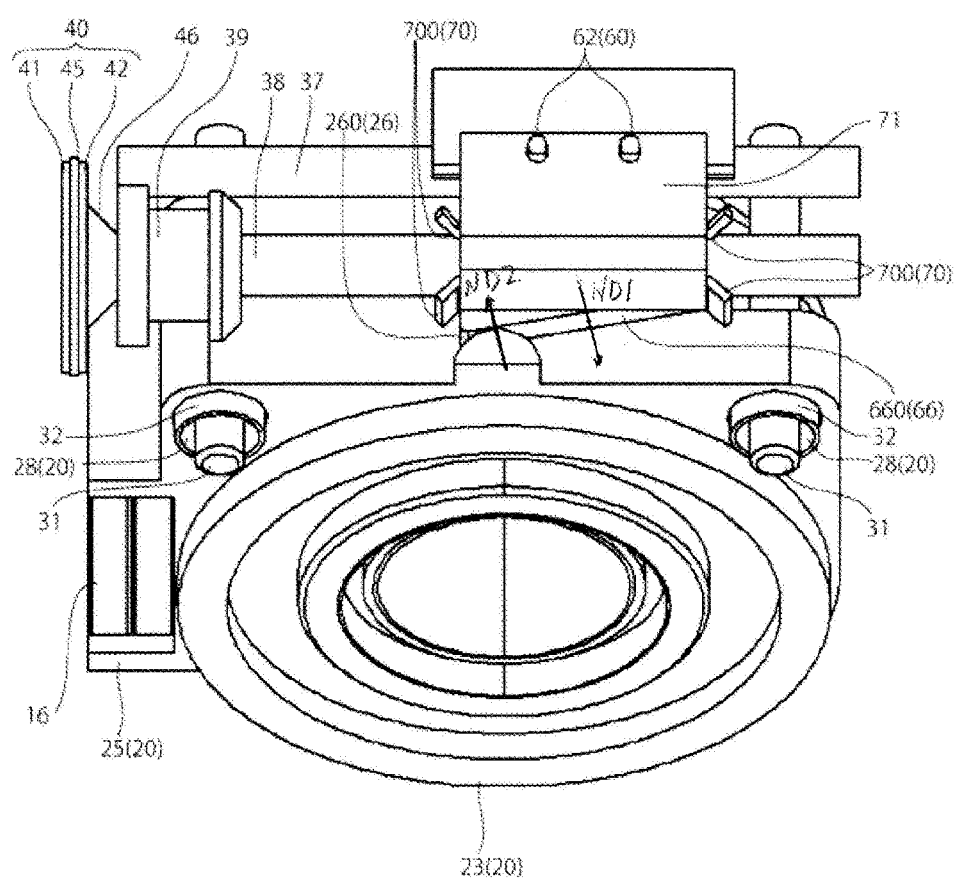
FIG. 6 is a perspective view of a main portion of a lens driving device according to another embodiment of the present disclosure.

The rear surface of the straight-ahead cam mechanism 60 is provided with a groove 69 and a protrusion portion 66 (see FIGS. 3 and 4). The groove 69 extends in the left-right direction and is notched so as to form a V-shape open to the rear side as viewed from the left-right direction. The protrusion portion 66 is provided on the upper side of the groove 69. One end surface of the protrusion portion 66 is a flat surface and is the first sliding surface 660. The normal direction of the first sliding surface 660 indicated by arrow ND1 as shown in FIGS. 4 and 6 is between the axial direction of the driving shaft 38 and the optical axis direction, and is oriented rearward and rightward. The first sliding surface 660 slides with respect to the second sliding surface 260 of the lens holding portion 20.

As shown in FIG. 5, the spring member 70 has a V-shaped portion and is configured by two springs, an L-shaped V-spring 71 and an L-shaped L-spring 72, as a whole. The L-spring 72 is combined on the outer side of the V-spring 71. A triangular gap 79 is provided between the V-shaped portion formed on the plate on the rear side of the V-spring 71 and the plate on the rear side of the L-spring 72. As shown in FIG. 3, the plate on the lower side of the L-spring 72 is provided with two positioning holes 77, and as shown in FIG. 5, the plate on the lower side of the V-spring 71 is provided with two positioning grooves 78.

The V-spring 71 is fixed to the straight-ahead cam mechanism 60 so that the positioning protrusions 62 of the flat surface portion 61 are fitted into the positioning grooves 78 and the V-shaped portion is accommodated in the groove 69. The L-spring 72 is fixed to the straight-ahead cam mechanism 60 by fitting the positioning protrusions 62 into the positioning holes 77 so that the plate on the lower side thereof comes into close contact with the plate on the lower side of the V-spring 71. The driving shaft 38 is passed through the gap 79 of the spring member 70. The inner surface of the spring member 70 facing the gap 79 between the V-spring 71 and the L-spring 72 is frictionally engaged with the driving shaft 38.

As shown in FIG. 4, extension piece portions 700 are provided at the left and right end edges of the spring member 70 where the gap 79 is formed. The extension piece portions 700 protrude while being bent so as to be separated from the driving shaft 38.

As shown in FIG. 3, the lens holding portion 20 has a semicircular shape in the upper half and a rectangular shape in the lower half when viewed from the optical axis direction. The lens holding portion 20 is provided with a through hole 27 which is a holding portion for holding the lens body 6 at the edge. The lens body 6 (not shown) is fitted into the through hole 27. The peripheral edge portion 22 on the front side surrounding the through hole 27 is raised forward with respect to the periphery thereof, and the peripheral edge portion 23 on the rear side is raised backward with respect to the periphery thereof.

A guide hole 28 is provided at the corner portion on the left lower side of the lens holding portion 20. The corner portion on the right lower side of the lens holding portion 20 is a thin-walled portion 24 thinner than the corner portion on the left lower side, and a guide hole 28 is provided at the thin-walled portion 24. The guide hole 28 penetrates the lens holding portion 20 in the optical axis direction. The guide hole 28 on the right side is longer in the left-right direction than in the up-down direction.

There is a frame portion 25 extending outward on the left surface of the lens holding portion 20. The frame portion 25 has a portal-shape. A magnet 16 is fitted into and fixed to the frame portion 25. The magnet 16 is opposed to the magnetic material plate 15 fixed to the inner surface of the side plate of the case 10 as the fixed portion with a gap therebetween. The magnet 16 and the magnetic material plate 15 constitute a pressing portion, and the lens holding portion 20 is pressed against the guide shaft 31 by the attraction force between the magnet 16 and the magnetic material plate 15, so that the movement of the lens holding portion 20 to be inclined away from the guide shaft 31 when the lens holding portion 20 moves in the optical axis direction is suppressed.

On the lower surface of the lens holding portion 20, a protrusion portion 26 is provided to protrude downward while being sandwiched between the two guide holes 28, 28. The protrusion portion 26 has a trapezoidal shape. One end surface of the protrusion portion 26 is a flat surface, and is the second sliding surface 260 having the same inclination as that of the first sliding surface 660 of the protrusion portion 66 of the straight-ahead cam mechanism 60 shown in FIG. 4. The normal direction of the second sliding surface 260 indicated by arrow ND2 as shown in FIGS. 4 and 6 is oriented forward and leftward, and the normal direction of the first sliding surface 660 indicated by arrow ND1 and the normal direction of the second sliding surface 260 indicated by arrow ND2 are the same in direction and opposite in orientation.

The lens holding portion 20 is movably supported in the optical axis direction by the guide shafts 31 and the coil springs 32 in the space between the front plate 11 of the case 10 and the rear plate 55 of the base 50. The guide shafts 31 extend in the optical axis direction. The guide shafts 31 are passed through the guide holes 28 of the lens holding portion 20. In FIG. 4, the guide shaft 31 on the left side is located between the second sliding surface 260 and the pressing portion, and the guide shaft 31 on the right side is provided at a position along the axial direction opposite to the guide shaft 31 on the left side with the second sliding surface 260 sandwiched therebetween. There is almost no gap between the guide shaft 31 on the left side and the guide hole 28. There is a gap between the guide shaft 31 on the right side and the guide hole 28, especially in the left-right direction. In FIG. 4, the lens holding portion 20 is pressed against the surface on the right side of the guide shaft 31 on the left side and is pressed against the surface on the lower side of the guide shaft 31 on the right side by the attraction force of the pressing portion. The front end portion of the guide shaft 31 is inserted into and fixed to the fixing hole 18 of the case 10. The rear end portion of the guide shaft 31 is inserted into and fixed to the fixing hole 58 of the base 50. The coil spring 32 is provided so as to connect the lens holding portion 20 and the table portion 56, and the guide shaft 31 penetrates the hollow portion thereof. The coil spring 32 is a preload portion for applying preload to the lens holding portion 20 in the optical axis direction, and is a compression spring. The lens holding portion 20 is previously urged forward by the coil spring 32.

As shown in FIG. 4, the support shaft 37 and the driving shaft 38 extend in the left-right direction. The right end portion of the support shaft 37 is inserted into and fixed to the fixing hole 837 of the support member 80 (see FIG. 3). The left end portion of the support shaft 37 is inserted into and fixed to the fixing hole 537 of the third column portion 53 (see FIG. 3). The right end portion of the driving shaft 38 is inserted into and fixed to a rubber bush (not shown), and the rubber bush is fitted in the round hole 838 (see FIG. 3). As shown in FIG. 5, the left end portion of driving shaft 38 is connected to the vibration member 40 through the rubber bush 39. As shown in FIG. 4, the vibration member 40 is formed by laminating a first piezoelectric element 41, an elastic thin plate 45, and a second piezoelectric element 42. The driving shaft 38 is fixed to the vibration member 40 by an adhesive 46. As shown in FIG. 3, a pad portion 49 protruding downward from the main body portion of the FPC48 is fixed to the left surface of the vibration member 40. The rubber bush 39 is fitted in the round hole 538 of the base 50. The main body portion of the FPC48 is bent in an L-shape, and the right surface is fitted into and fixed to the recess portion 548 of the base 50. At this time, the position sensor 481 provided on the right surface of the FPC48 is fitted into the hole 549. The position sensor 481 is located between the magnet 16 and the magnetic material plate 15 and opposes to the magnet 16. The rear surface extends toward the outside of the device from the rear end portion of the case 10. The magnet 16 stabilizes the lens holding portion 20 by the attraction force with the magnetic material plate 15, and also serves as a magnet for position detection. The position sensor 481 detects the magnetic field from the magnet 16 and outputs a signal for position control in the optical axis direction of the lens holding portion 20. Further, since the magnetic material plate 15 serves as a yoke, the input magnetic field to the position sensor 481 can be increased. Further, since the lens holding portion 20 is pressed against the guide shaft 31 by the attraction force between the magnet 16 and the magnetic material plate 15, the distance between the magnet 16 and the position sensor 481 is kept constant, and the stable position control is obtained.

The straight-ahead cam mechanism 60 is adjacent to the lower side of the lens holding portion 20 and is movably supported in the axial direction of the driving shaft 38 by the support shaft 37 and the driving shaft 38 bridged between the support member 80 and the third column portion 53, as shown in FIG. 4, the first sliding surface 660 of the straight-ahead cam mechanism 60 is in contact with the second sliding surface 260 of the lens holding portion 20.

When a predetermined pulse voltage is repeatedly applied to the piezoelectric element from the FPC48, the vibration member 40 is finely deformed, and thereby, the driving shaft 38 repeats a fine reciprocating asymmetric reciprocating movement. For example, in FIG. 4, the straight-ahead cam mechanism 60 moves intermittently to the left side by repeating movements such as following and moving to the left side when the driving shaft 38 moves slowly to the left side, and remaining at the position without following when the driving shaft 38 moves rapidly to the right side. When the reverse operation is performed, the straight-ahead cam mechanism 60 moves intermittently to the right side.

When the straight-ahead cam mechanism 60 moves to the right side, the first sliding surface 660 of the straight-ahead cam mechanism 60 slides to the right side with respect to the second sliding surface 260 of the lens holding portion 20, and a rearward force is applied to the lens holding portion 20 from the straight-ahead cam mechanism 60. With this force, the lens holding portion 20 moves to the rear side against the elastic force of the coil spring 32. When the straight-ahead cam mechanism 60 moves to the left side, the first sliding surface 660 of the straight-ahead cam mechanism 60 slides to the left side with respect to the second sliding surface 260 of the lens holding portion 20, and the rearward force applied to the lens holding portion 20 from the straight-ahead cam mechanism 60 becomes weak, and the forward urging force by the coil spring 32 is superior. With this force, the lens holding portion 20 moves to the front side by the elastic force of the coil spring 32.

The above is the details of the present embodiment. The lens driving device 5 according to the present embodiment comprises: a lens holding portion 20 that has a holding portion for holding a lens body 6 and is supported so as to be movable in the optical axis direction of the lens body 6; a driving shaft 38 extending and supported in a direction orthogonal to the optical axis direction; a vibration member 40 connected to one end of the driving shaft 38 and causing the driving shaft 38 to micro-vibrate; and a straight-ahead cam mechanism 60 supported by the driving shaft 38 so as to be movable in the axial direction of the driving shaft 38. The straight-ahead cam mechanism 60 is provided with a first sliding surface 660, and the lens holding portion 20 is provided with a second sliding surface 260. By sliding of the first sliding surface 660 with respect to the second sliding surface 260, a force by which the straight-ahead cam mechanism 60 moves in the axial direction is converted into a force for moving the lens holding portion 20 in the optical axis direction. Since a low-profile of the lens driving device can be realized by arranging the driving shaft 38 in the direction orthogonal to the optical axis direction, and even in this case, the force by which the straight-ahead cam mechanism 60 moves in the axial direction is converted into a force for moving the lens holding portion 20 in the optical axis direction, the lens body 6 does not rotate. Accordingly, it is possible to realize a low-profile of the lens driving device 5 using the vibration member 40 as a driving source without accompanying the rotation of the lens body 6.

It is to be noted that, in the above embodiment, one of the first sliding surface 660 and the second sliding surface 260 may be a curved surface. For example, as shown in FIG. 6, the protrusion portion 66 may be in a semi-cylindrical shape, and the first sliding surface 660 may be in a shape semicircularly curved. Further, the protrusion portion 26 may be in a semi-cylindrical shape. At this time, at the position where the first sliding surface 660 and the second sliding surface 260 slide, the normal direction of the first sliding surface 660 indicated by arrow ND1 and the normal direction of the second sliding surface 260 indicated by arrow ND2 are the same in direction and opposite in orientation.

Further, in the above embodiment, the coil spring 32 may be an extension spring instead of a compression spring. Further, the coil spring 32 may be provided between the case 10 and the lens holding portion 20, and the hollow portion thereof may be arranged without passing through the guide shaft 31. Further, as the preload portion, instead of the coil spring 32, a leaf spring may be used, and the attraction force between the magnet and the magnetic body, the attraction force or repulsion force between magnets may be used. As the vibration member 40, a so-called lamination type member in which a plurality of piezoelectric elements are stacked may be used.

Further, in FIG. 5, the shape of the guide hole 28 on the left side and the shape of the guide hole 28 on the right side may be reversed. The magnetic material plate 15 may be provided at, for example, a fixed portion such as the side plate 54 of the base 50. The magnet 16 may be provided at the fixed portion and the magnetic material plate 15 may be provided at the lens holding portion 20. Further, instead of the magnetic material plate 15, another member such as the second magnet may be used. In this case, an attraction force or a repulsion force may act between the magnet 16 and the second magnet. Further, the above embodiment has been described as being mounted on the smartphone 9, but it may be another electronic apparatus such as a monitoring camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A lens driving device comprising:
    a base having a rear plate and a plurality of column portions rising from the rear plate and a support member fixed to the rear plate;
    a lens holding portion having a through hole into which a lens body is fitted, the lens body through which light is incident along an optical axis direction and a protrusion portion provided on a lower surface of the lens holding portion, the protrusion portion having a second sliding surface, the lens holding portion is supported so as to be movable in the optical axis direction of the lens body;
    a driving shaft extending and supported by a column portion of the base and the support member in a direction orthogonal to the optical axis direction;
    a vibration member comprising a laminated first piezoelectric element, an elastic thin plate, and a second piezoelectric element, the vibration member connected to one end of the driving shaft and causing the driving shaft to micro-vibrate so as to repeat a fine reciprocating movement in an axial direction of the driving shaft orthogonal to the optical axis direction; and
    a straight-ahead cam mechanism having a spring member accommodated in a groove provided within a rear surface thereof and frictionally engaged with the driving shaft, and a protrusion portion provided with a first sliding surface on an upper side of the groove, the straight-ahead cam mechanism supported by the driving shaft so as to be movable in the axial direction of the driving shaft,
    wherein by sliding of the first sliding surface with respect to the second sliding surface, a force by which the straight-ahead cam mechanism moves in the axial direction is converted into a force for moving the lens holding portion in the optical axis direction.

2. The lens driving device according to claim 1, further comprising a preload portion that applies a preload to the lens holding portion in the optical axis direction.

3. The lens driving device according to claim 2, further comprising a guide shaft extending in the optical axis direction, wherein the lens holding portion is provided with a guide hole, and the guide shaft is passed through the guide hole.

4. The lens driving device according to claim 3, wherein two guide holes are provided so as to sandwich the second sliding surface therebetween.

5. The lens driving device according to claim 3, wherein the preload portion is a coil spring, and the guide shaft penetrates a hollow portion thereof.

6. The lens driving device according to claim 1, wherein the first sliding surface formed on an end surface of the protrusion portion of the straight-ahead cam mechanism is a flat surface of which a normal direction is oriented in a direction between the axial direction of the driving shaft and the optical axis direction and the second sliding surface formed on an end surface of the protrusion portion of the lens holding portion is a surface having the same inclination as the first sliding surface.

7. The lens driving device according to claim 6, wherein the second sliding surface is a flat surface, and the normal direction of the first sliding surface and a normal direction of the second sliding surface are the same in direction and opposite in orientation.

8. The lens driving device according to claim 6, wherein the second sliding surface is a curved surface, and wherein upon sliding the second sliding surface across the first sliding surface, the normal direction of the first sliding surface and a normal direction of the second sliding surface are the same in direction and opposite in orientation.

9. The lens driving device according to claim 1, further comprising a support shaft extending in the axial direction, wherein the straight-ahead cam mechanism is provided with a support hole, and the support shaft is passed through the support hole.

10. The lens driving device according to claim 1, wherein:
in the straight-ahead cam mechanism, the protrusion portion with the first sliding surface protrudes in the optical axis direction from the upper side of the groove, and
in the lens holding portion, the protrusion portion with the second sliding surface protrudes from the lower surface of the lens holding portion.

11. The lens driving device according to claim 1, further comprising a pressing portion that presses the lens holding portion toward the axial direction.

12. The lens driving device according to claim 11, wherein:
the pressing portion comprises: a magnet provided at the lens holding portion; and
a magnetic material plate provided to face the magnet and applies an attraction force to the magnet, and
the lens holding portion presses a guide shaft extending in the optical axis direction by the attraction force.

13. The lens driving device according to claim 12, wherein two guide shafts are provided, one guide shaft is arranged at a position between the second sliding surface and the pressing portion, and the other guide shaft is arranged at a position along the axial direction on a side opposite to the one guide shaft with the second sliding surface sandwiched therebetween.

14. The lens driving device according to claim 12, further comprising a position sensor, wherein the position sensor is positioned between the magnet and the magnetic material plate, and faces the magnet to detect a magnetic field of the magnet.

15. A camera device comprising the lens driving device of claim 1.

16. An electronic apparatus comprising the camera device of claim 15.

* * * * *